United States Patent Office 3,109,823
Patented Nov. 5, 1963

3,109,823
METHOD OF PREPARING CATALYST FOR HYDROCARBON CONVERSION
Lee A. Cosgrove, West Chester, Pa., assignor to Air Products and Chemicals, Inc., a corporation of Delaware
No Drawing. Filed Apr. 5, 1960, Ser. No. 20,037
3 Claims. (Cl. 252—442)

This invention relates to a method of preparing a platinum on alumina catalyst and to a method of converting hydrocarbons over said catalyst.

The hydrogenation-dehydrogenation activity of a platinum on alumina catalyst may be described by a cyclohexane dehydrogenation test number, using a standard test which is described in previous literature. The hydrogenation-dehydrogenation function of a catalyst may be measured by dehydrogenation of cyclohexane to benzene at selected and controlled conditions. By determining the benzene content (e.g. by refractive index) of the liquid effluent from a catalyst zone subjected to a mixture of one mol of pure cyclohexane and 4 mols of hydrogen at a liquid space rate of 6, at atmospheric pressure, and at an accurately measured temperature within the range from 600° F. to 700° F., the results being calculated as if the temperature were precisely 650° F., the hydrogenation-dehydrogenation activity of the catalyst is measured. The high space rate and other conditions are such that the conversion is less than the equilibrium value.

A hydrogenation-dehydrogenation catalyst of outstanding effectiveness, when tested by the cyclohexane test, provides benzene contents of about 70 to 85%. If the cyclohexane test results indicate benzene contents such as 55%, the catalyst is very much more effective as a hydrogenation-dehydrogenation catalyst than many catalysts commercially used for hydrogenation and/or dehydrogenation reactions. The advantage of the cyclohexane tests resides in its ability to detect slight deficiencies in catalyst characteristics which might otherwise be discovered only by prolonged industrial use.

Sorptive alumina contains less chemically combined (as distinguished from sorbed) water than the stoichiometric amount of water originally present in the precursor alumina hydrate. If granular sized particles of sorptive alumina are impregnated with chloroplatinic acid and thereafter reduced in a hot hydrogen stream, the catalyst contains an amount of chloride slightly greater than the amount of platinum. While simple water washing may remove a minor fraction of the chloride content without substantially lowering the acid activity, other more drastic procedures have been proposed for further dechloriding such chloroplatinated alumina, whereby the acid activity of the catalyst has been lowered. Unfortunately, some of the dechloriding procedures have also lowered the hydrogenation-dehydrogenation activity, whereby the cyclohexane number for the dechlorided catalyst has been discouragingly low. Other procedures for dechloriding chloroplatinated alumina have required the use of expensive controls and/or apparatus so that commercial production has been discouraged notwithstanding favorable data obtained in the research laboratories. There has continued to be a demand for a dechlorided catalyst derived from chloroplatinated alumina, and research work on dechloriding procedures has continued.

Summary of the Invention

In accordance with the present invention catalyst particles characterized by platinum on sorptive alumina, and containing an amount of chloride not more than 25% by weight of the platinum are prepared by water-leaching the chloride content from particles previously treated with gaseous ammonia subsequent to the treatment of the chloroplatinated alumina particles with gaseous hydrogen sulfide. Surprisingly, the reaction of the chloroplatinated sorptive alumina with the successive gaseous reagents, hydrogen sulfide and ammonia transforms the chloride content of the chloroplatinated alumina from a firmly bound to an easily leachable condition.

In certain embodiments of the present invention, pellets of high surface area eta alumina are subjected to high humidity air at temperatures below 160° F. until the sorptive pellets have adsorbed additional moisture and the thus moisture-containing pellets are impregnated with chloroplatinic acid, whereby completed catalyst particles possessing dehydrogenation activity and/or stability greater than possible in the absence of such humidification step are achieved. Such humidified pellets have a moisture content of 15–20% volatile matter, such as obtained by conducting the humidification for at least 20 but less than 80 minutes at a temperature between 60° and 160° F. using a gas stream having a water vapor pressure greater than about 20 mm. of mercury, said gas stream having a relative humidity greater than about 50% but less than 95%.

In certain embodiments of the invention, after the high surface area pellets have been humidified, impregnated with chloroplatinate, evacuated, sulfided with gaseous hydrogen sulfide, evacuated, ammoniated with gaseous ammonia, leached with water until the chloride content is reduced to less than 25% of the weight of the platinum, and dried, the pellets are heated to a temperature within the range from 600° F. to 1000° F. and treated with hydrogen gas to reduce the platinum to the metallic state prior to use of the pellets in vapor phase conversions of organic compounds.

In certain embodiments of the present invention, the sorptive alumina employed has a residual moisture content in the range from 5 to 10% volatile matter and has a surface area of at least 200 m.$^2$/g. and is derived from alumina hydrates containing a major amount of beta alumina trihydrate. It is convenient to describe such alumina as high surface area eta alumina notwithstanding the possibility of detecting other forms of alumina therein. After impregnation of such high surface area eta alumina with chloroplatinic acid and treatment with gaseous hydrogen sulfide and gaseous ammonia and water-leaching substantially all of the chloride content from the particles, there is provided a dual function catalyst possessing good stability as a hydrogenation catalyst and possessing good stability for acid catalyzed reactions by reason of the acidity of the sorptive alumina. Such dehalided platinum on eta alumina catalysts have commercially acceptable stability for upgrading naphtha to octane numbers high enough to be of commercial interest.

A hydrocarbon conversion method can be carried out in the presence of a catalyst consisting essentially of eta type sorptive alumina containing a minor amount of platinum and containing an amount of halide not greater than about 25% by weight of the platinum content of the catalyst, provided the catalyst is prepared in accordance with said special method comprising treatment of the chloroplatinated alumina with gaseous hydrogen sulfide and ammonia.

The nature of the present invention can be further clarified by reference to a plurality of sets of technical data.

Example 1

A sample of 980 parts by weight of pellets of an activated alumina is used for the support in the catalyst preparation. Substantially pure beta alumina trihydrate is formed into pellets, dried and heat treated first at 650° F. and then at 750° F. to provide said activated alumina pellets. This material has the following physical properties: individual pellet size of approximately 3/32 inch in any major dimension, 311 square meters/gram surface area, 28% absorption and 5.27% volatile matter (ignition loss at 1400° F. for 2 hours). The pellets are humidified at 90° F. in an air atmosphere of 65% relative humidity to a value of approximately 22% volatile (I.L. at 1400° F. for 2 hours). A dilute aqueous solution of chloroplatinic acid containing approximately 4.08 g. of platinum is sprayed onto a tumbling bed of the humidified alumina pellets. The amount of solution is just sufficient to saturate the alumina but with no excess solution. The thus impregnated pellets are tumbled and stirred for approximately 3 hours to promote uniformity in distribution of the impregnating solution throughout the alumina.

After the 3 hour impregnation period, the impregnated pellets are placed in a rotating pressure drum and evacuated, the absolute pressure being approximately 5 inches Hg for about one hour. Then the vacuum is broken by introducing gaseous hydrogen sulfide at room temperature until there is a slight positive pressure of hydrogen sulfide. The pellets are maintained in a hydrogen sulfide atmosphere for 75 minutes, at the end of which time no additional hydrogen sulfide is being taken up by the material under treatment.

At the end of the sulfiding treatment, the pellets are subjected again to a reduced pressure of approximately 5 inches Hg and the vacuum is broken by introducing ammonia gas at room temperature until there is a slight positive pressure of ammonia gas. The sulfided pellets are maintained in the ammonia atmoshpere until sorption is complete in approximately 4 hours. There is a slight temperature rise of approximately 45° F. during the first 25 minutes of treatment from room temperature to approximately 135° F. followed by a steady decrease in the temperature to room temperature over the remaining treating period. After the completion of the ammonia gas treatment, the treated material is water-washed with deionized water by soaking and immediate decantation. Additional subsequent water-washings are performed in which the added water stays in contact with the submerged catalyst for approximately fifteen minutes before decanting of the liquid. After the eighth treatment with water in which the pellets have been submerged for several hours, the decanted water shows the absence of chloride ions when tested for the presence of the chloride ion by the use of silver nitrate solution. In modifications of the procedure, the washing is continued as many times as necessary to obtain chloride free wash water.

The washed pellets are dried in an air stream in an oven for 2 hours at 220° F. and then charged to a furnace at 900° F. and treated with dry nitrogen until the catalyst reaches the tempertaure of the furnace and then treated at 900° F. for 2 aours in a flowing air stream at approximately 1 volume of air/volume of pellets. The thus heat-treated pellets are purged with inert gas and then treated at 900° F. with a hydrogen stream for 15 minutes and cooled in the hydrogen stream to provide catalyst pellets.

The catalyst thus prepared has the following physical properties: about 0.88 kg./ltr. bulk density; about 17.1 lbs./sq. in. crushing strenght; approximately 300 sq. meters/gm. surface area; and 2% volatile matter (ignition loss 1400° F. for 2 hours). Activity by the cyclohexane test shows better than 72% benzene. Standard chemical analysis covering the material shows the presence of 0.5% platinum and somewhat less than 0.06% chloride, both by weight of the catalyst. Thus the chloride content is less than 25% by weight of the platinum content of the catalyst.

*Example II*

Pellets of sorptive alumina were measured and found to have a moisture content of about 22% inasmuch as the heating of the pellets for two hours at 1400° F. resulted in an ignition loss of 22%. The pellets were approximately cylinders having a length about equal to diameter and were approximately 3/32 inch in diameter. The pellets had a surface area of 311 m.²/g. A summary of the steps by which said pellets had been prepared included: extrusion of beta alumina trihydrate-nitric acid mix; calcination of such pellets to form sorptive alumina containing about 5% hydrate water as measured by ignition loss and humidification of the sorptive alumina pellets with moist air below 160° F. until said 22% ignition loss (summation of hydrate water and sorbed water) was attained. A batch of 908 grams of the humidified alumina pellets were placed in a two liter suction flask and impregnated with an aqueous solution of chloroplatinic acid, the amount and concentration of the chloroplatinic acid being preselected to provide 0.5% platinum by weight in the completed catalyst.

A vacuum pump was employed in reducing the pressure in the flask to about 5 inches of mercury absolute pressure and this reduced pressure was maintained for several minutes. A stream of gaseous hydrogen sulfide was then introduced into the flask and the introduction of hydrogen sulfide was continued until the pressure inside the flask was about 1.25 atmospheres. The hydrogen sulfide was allowed to react with the chloroplatinated pellets for approximately 75 minutes and then the flask was again evacuated to provide an absolute pressure of about one-sixth atmosphere. Gaseous ammonia was then introduced into the flask until the internal gas pressure was about 1.25 atmospheres, and the ammonia was allowed to react with the sulfided platinum on alumina pellets for about 4 hours. Th ammonia reacted with the chloride content of the catalyst and/or other components in the system so that the temperature rose from about room temperature (60° F.) to about 140° F. The pellets, after being subjected to the ammonia atmosphere, were permitted to cool to about room temperature. The thus cooled pellets were rinsed with water several times. The water employed in this rinsing was distilled water containing substantially no halide. Each washing of the catalyst required a quantity of deionized water approximately equal to the volume of the catalyst. The wash liquid from the sixth washing was sufficiently free from chloride ion to give a negative test with silver nitrate solution. After the eighth wash the pellets were dried for 2 hours at 220° F. in a dry air stream.

The thus dried catalyst particles were heated at 900° F. in a stream of bone dry air flowing at a rate corresponding to 60 volumes of air per volume of catalyst per hour. The particles were maintained at 900° F. in the dry air stream for 2 hours and were then allowed to cool to room temperature. The catalyst particles had a bulk density of 0.87 kilogram per liter, a crushing strength of 17.5 lbs., a surface area of 300 m.²/g. and an ignition loss of about 2% at 1400° F. for 2 hours. Particular attention is called to the fact that the particles thus prepared had a platinum content of 0.48% by weight of the catalyst. The chloride content of the catalyst was 0.054%. The chloride concentration was only about 14% of the platium concentration.

This catalyst was employed in an apparatus suitable for laboratory-scale reforming of gasoline in the presence of hydrogen. During the initial heating of the catalyst, a stream of hydrogen reduced the platinum compound to metallic platinum. The naphtha was reformed at 925° F., 500 p.s.i.g., at a space rate of 3 volumes of a standard naphtha per volume of catalyst per hour at a ratio of 6 mols of hydrogen per mol of naphtha and the F–1 clear octane number of the reformate was 95 initially and 91 after 400 hours on stream.

Using the same standard test on the same standard naphtha, a comparative examination was made with a catalyst prepared similarly except that the chloride content was not removed or lowered. This catalyst was prepared in accordance with a commercial method, and all of this catalyst except that removed for sample and test purposes was employed in conjunction with other batches of catalyst, similarly prepared, in commercial operation. This catalyst contained, all by weight of the final catalyst, about 99% activated alumina, about 0.5% platinum and about 0.55% chloride. The reformate obtained in this standard test had an F–1 clear octane rating of 95 initially and 91 after 400 hours on stream. Thus it was established that the dehaliding method of the present invention could be employed in the manufacture of a commercially usable catalyst for hydrogenative reforming of gasoline.

Obviously many modifications and variations of the invention as hereinbefore set forth may be made without departing from the spirit and scope thereof, and therefore only such limitations should be imposed as are indicated in the appended claims.

What is claimed is:

1. A method for preparing catalyst particles having the advantageous combination of from 0.1 to 2% by weight of platinum on a sorptive alumina carrier which method comprises a chronological series of steps including: preparing hydrated alumina granules substantially free from chloride; subjecting such granules to high temperature dehydration to prepare sorptive alumina particles substantially free from chloride; cooling the sorptive alumina particles; impregnating aqueous solution containing chloroplatinate ion into the sorptive alumina particles to provide chloroplatinated alumina particles having a platinum content within the range from 0.1 to 2% by weight, said impregnating being conducted at a temperature within the range from 60° F. to 140°F.; subjecting the chloroplatinated alumina particles to gaseous hydrogen sulfide at a temperature within the range from about 60° F. to about 140° F.; subjecting the sulfided particles to gaseous ammonia at a temperature within the range from about 60° F. to about 140° F.; washing the ammonia-treated particles with deionized water to remove substantially all of the chloride derived from the chloroplatinate, whereby the chloride content of the particles is reduced to less than 25% of the platinum content, said washing being conducted at a temperature within the range from about 60° F. to about 140° F.; drying the particles subsequent to said impregnating, sulfiding, ammoniating, and washing of the particles; and withdrawing as the product of the process dry sorptive alumina particles having a chloride content less than 25% by weight of the platinum content, said particles containing platinum constituting from 0.1 to 2% by weight of the particles.

2. The method of claim 1 in which the sorptive alumina particles, prior to chloroplatinate impregnation, are treated with a moist gas at a temperature within the range from 60° F. to 140° F. to deposit a significant amount of sorbed moisture several times greater than the chemically combined water in the particles prior to such treatment.

3. The method of claim 2 in which the sorptive alumina particles are obtained by the high temperature dehydration of a hydrated alumina containing a major amount of beta trihydrate.

References Cited in the file of this patent

UNITED STATES PATENTS

| | | |
|---|---|---|
| 2,479,110 | Haensel | Aug. 16, 1949 |
| 2,602,772 | Haensel | July 8, 1952 |
| 2,891,965 | Voltz et al. | June 23, 1959 |
| 2,908,656 | Heinemann et al. | Oct. 13, 1959 |
| 2,968,635 | Nixon | Jan. 17, 1961 |

UNITED STATES PATENT OFFICE
CERTIFICATE OF CORRECTION

Patent No. 3,109,823 November 5, 1963

Lee A. Cosgrove

It is hereby certified that error appears in the above numbered patent requiring correction and that the said Letters Patent should read as corrected below.

Column 3, line 51, for "aours" read -- hours --; column 4, line 8, for "908" read -- 980 --.

Signed and sealed this 28th day of April 1964.

(SEAL)
Attest:
ERNEST W. SWIDER

Attesting Officer

EDWARD J. BRENNER

Commissioner of Patents